(12) United States Patent
Ducloux et al.

(10) Patent No.: US 10,097,889 B2
(45) Date of Patent: Oct. 9, 2018

(54) METHOD OF ADAPTIVE BROADCASTING OF MULTIMEDIA STREAMS BY USING AN ENERGY INDEX

(71) Applicant: Harmonic, Inc., San Jose, CA (US)

(72) Inventors: Xavier Ducloux, Rennes (FR); Patrick Gendron, Chateaugiron (FR)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 14/906,081

(22) PCT Filed: Jul. 17, 2014

(86) PCT No.: PCT/EP2014/065439
§ 371 (c)(1),
(2) Date: May 3, 2016

(87) PCT Pub. No.: WO2015/007868
PCT Pub. Date: Jan. 22, 2015

(65) Prior Publication Data
US 2016/0234549 A1 Aug. 11, 2016

(30) Foreign Application Priority Data

Jul. 19, 2013 (FR) ..................................... 13 57127
Jan. 7, 2014 (FR) ..................................... 14 50092
Mar. 26, 2014 (FR) ..................................... 14 52560

(51) Int. Cl.
*H04N 21/2343* (2011.01)
*H04N 21/2365* (2011.01)
(Continued)

(52) U.S. Cl.
CPC ....... *H04N 21/4424* (2013.01); *H04N 19/102* (2014.11); *H04N 19/14* (2014.11);
(Continued)

(58) Field of Classification Search
None
See application file for complete search history.

(56) References Cited

U.S. PATENT DOCUMENTS

2009/0167789 A1* 7/2009 Kerofsky ............. G09G 3/3406
345/690
2010/0091640 A1* 4/2010 Huang .................. H04L 1/0036
370/201

(Continued)

OTHER PUBLICATIONS

ISO "Preliminary Working Draft for MPEG Green" MPEG Meeting of ISO, Vienna, Austria (Aug. 2013).
(Continued)

*Primary Examiner* — Brian T Pendleton
*Assistant Examiner* — Jean D Saint Cyr
(74) *Attorney, Agent, or Firm* — Brokaw Patent Law PC; Christopher J Brokaw

(57) ABSTRACT

Method of adaptive broadcasting of multimedia data streams $F_i$ originating from a service provider (20), during a download between a reception terminal (40) and a server (30), as a function of an energy criterion, comprising the following steps:

determining, for N representations $F_i$, at least one first energy index by calculating, for each of the representations $F_i$ of a multimedia segment, a value of energy $E_i(t)$ consumed to decode the representation $F_i$ at the instant t, the maximum energy value $E_{max}(t)$ associated with the most energy-consuming representation, and the values of the ratios corresponding $$\frac{E_i(t)}{E_{Max}(t)}$$

(Continued)

storing these values in a file associating with a representation $F_i$ at least one ratio $$\frac{E_i(t)}{E_{Max}(t)},$$

measuring the consumption of energy used by the terminal in the course of the playback of the representation $F_i$, and choosing another representation $F_j$ or altering the quality of playback of the representation if the energy reserve of the terminal is insufficient to play back the content of the multimedia data stream on the basis of the representation $F_i$.

21 Claims, 5 Drawing Sheets

(51) Int. Cl.
| | | |
|---|---|---|
| *H04N 21/238* | (2011.01) | |
| *H04N 21/4402* | (2011.01) | |
| *H04N 21/442* | (2011.01) | |
| *H04N 21/443* | (2011.01) | |
| *H04N 19/46* | (2014.01) | |
| *H04N 19/102* | (2014.01) | |
| *H04N 19/14* | (2014.01) | |
| *H04N 19/156* | (2014.01) | |
| *H04N 19/162* | (2014.01) | |
| *H04N 21/6587* | (2011.01) | |
| *H04N 21/462* | (2011.01) | |
| *H04N 19/30* | (2014.01) | |

(52) U.S. Cl.
CPC ......... *H04N 19/156* (2014.11); *H04N 19/162* (2014.11); *H04N 19/46* (2014.11); *H04N 21/23439* (2013.01); *H04N 21/4436* (2013.01); *H04N 21/4621* (2013.01); *H04N 21/6587* (2013.01); *H04N 19/30* (2014.11)

(56) References Cited

U.S. PATENT DOCUMENTS

| | | | |
|---|---|---|---|
| 2011/0041156 A1 | 2/2011 | Ramaswarmy | |
| 2012/0122513 A1* | 5/2012 | Yang | H04L 5/0035 455/522 |
| 2013/0329777 A1* | 12/2013 | Konda | H04L 67/04 375/240.01 |

OTHER PUBLICATIONS

Pedderson, J. et al. "Energy Driven Application Self-Adaptation at Run-Time" International Conference on VLSI Design (Jan. 2007).

ISO "Information Technology—Green Video" MPEG Meeting of ISO, San Jose, California, United States (Jan. 2014).

Ducloux et al.. "Additional Power Saving Ratio for Adaptive Streaming" MPEG Meeting, Valencia, Spain, (Mar. 2014).

Ducloux et al. "Display Adaptation Metadata for Green Adaptive Streaming" MPEG meeting of ISO, San Jose, California, United States (Jan. 2014).

Moldovan et al. "Personalisation of the Multimedia Content Delivered to Mobile Device Users" International Symposium on IEEE, Piscataway, New Jersey, United States (May 2009).

ISO "Context, Objectives, Use Cases and Requirements for Green MPEG." MPEG Meeting of ISO, Incheon, Korea (Apr. 2013).

* cited by examiner

METHOD OF ADAPTIVE BROADCASTING OF MULTIMEDIA STREAMS BY USING AN ENERGY INDEX

TECHNICAL FIELD

The subject of the invention relates to a method and a system allowing adaptive broadcasting of multimedia streams (choice of the representation to be downloaded), between a server and one or more terminals by using at least one criterion of energy consumed by the terminal. It applies, for example, in respect of mobile terminals having limited self-sufficiency, in particular when a user desires to view videos broadcast over the Internet.

PRIOR ART

Generally, data content is distributed via servers managed by service providers. Thus, in order to receive a specific content, a user will send a request to a server that stores this content. The user will generally receive these data on a mobile telephone, a tablet or any other equivalent device. The generalization of high-bitrate access, 4G networks for example, as well as the advent of the HEVC high efficiency video coding compression standard will lead to more significant on-line video use than that observed today. The problem of the self-sufficiency of mobile terminals is therefore a crucial problem. Currently, consumption reduction techniques are known for partly alleviating this problem. These techniques are implemented by integrated circuit manufacturers. They rely on the dynamic observation of the use of the processors of the mobile terminals and adjust the working frequencies and the electrical supply voltages as a function of the result, which will therefore modify the power consumed. Unfortunately, the reactivity of these devices is not sufficient and could be improved. Work is being conducted to improve the behavior of the terminal so that adjustment of the processor frequency/supply voltage pair is more dynamic and dependent on the complexity of the image to be decoded, thus making it possible to manage the necessary energy; but this will without doubt have a limit related to the nature of the stream to be decoded.

The current solutions of adaptive broadcasting of streams or "adaptive streaming", whatever the standard used, adopt a strategy for selecting the segments or chunks of audio/video media to be downloaded, based solely on the resolution/bitrate pair. Thus, if the network conditions are good, the terminal will be able to select and decode segments of high resolution and high bitrate, leading to high decoding complexity.

The "green MPEG" working group proposes to introduce a third criterion for selecting the video segments to be downloaded, namely energy consumption.

SUMMARY OF THE INVENTION

An objective of the present invention is to propose a method which relies on the use of an index expressing in relative terms the energy necessary for the decoding of a stream or representation with respect to the most energy-greedy stream for a given information content, doing so in a manner independent of the coder used to code the segments and of the processor of the terminal, as well as of complementary indices making it possible to deduce the energy necessary for visual and sound playback of acceptable quality.

Another objective is to have a second index corresponding to the energy necessary for the decoding of a segment of a stream or representation at an instant t with respect to the precedent segment of the same stream or representation at the instant t−1, which makes it possible to optimize the management of the energy in certain cases of use.

In the description, the abbreviations PSR (Power Saving Ratio) or DOR (Decoding Operation Ratio) which are more commonly used in MPEG terminology designate one and the same energy saving ratio.

The method according to the invention is used in a preferential manner in respect of battery operated terminals but can also be of interest in respect of a mains powered device.

The invention relates to a method of adaptive broadcasting of multimedia or representation data streams $F_i$ originating from a service provider, during a download between a reception terminal and a server of the service provider, as a function of an energy criterion, characterized in that it comprises at least the following steps:

for the service provider:
  determining, for N representations, at least one first energy index by calculating, for each of the representations $F_i$ of a multimedia segment, a value of energy $E_i(t)$ consumed to decode the representation $F_i$, the maximum energy value $E_{max}(t)$ associated with the most energy-consuming representation and the values of the ratios corresponding $$\frac{Ei(t)}{EMax(t)}$$

storing these values in a file associating with a representation $F_i$ at least one ratio value $$\frac{E_i(t)}{E_{Max}(t)},$$

for the reception terminal:
  measuring the consumption of energy used by the terminal in the course of the playback of the representation $F_i$, and choosing another representation $F_j$ on the basis of the energy indices or altering the quality of the representation, if the energy reserve of the terminal is insufficient to play back the content of the multimedia data stream over the desired duration on the basis of the representation $F_i$.

According to an implementation variant, the method determines a second index corresponding to a value of ratio $$\frac{Ei(t)}{Ei(t-1)}$$

for a given representation $F_i$ at a given instant and this value of second index is used to analyze the evolution of the representation and to anticipate/adapt the energy saving need.

The method can also comprise the following steps:
for the service provider:
  storing the values $$\frac{E_i(t)}{E_{Max}(t)} \text{ and } \frac{E_i(t)}{E_i(t-1)}$$

in a manifest file describing the nature and the storage address of the available representations or in data fields pointed at by the manifest file associating with a representation $F_i$ a first index $$\frac{E_i(t)}{E_{Max}(t)}$$

and a second index $$\frac{E_i(t)}{E_i(t-1)},$$

for the reception terminal:
  measuring the consumption of energy used by the terminal in the course of the playback of the representation $F_i$, analyzing the evolution of said representation $F_i$ provided by $$\frac{E_i(t)}{E_i(t-1)}$$

and choosing another representation $F_j$ if the energy reserve of the terminal is insufficient to play back the content of the multimedia data stream over the desired duration on the basis of the representation $F_i$.

According to an implementation variant, the method moreover determines the fundamental characteristics of the histograms of the values of brightness and/or of colors of the pixels corresponding to the multimedia segments. The method then comprises the following steps:
  for the service provider:
    storing the fundamental characteristics of the histograms of the values of brightness and/or of colors of the pixels corresponding to the multimedia segments, in a manifest file describing the nature and the storage address of the available representations or in data fields pointed at by the manifest file,
  for the reception terminal:
    measuring the consumption of energy used by the terminal in the course of the playback of the representation $F_i$, and
    implementing an energy saving strategy by optimizing a combination:
      of an automatic or manual choice of a representation $F_j$, having a lower energy consumption ratio $$\frac{E_j(t)}{E_{Max}(t)}$$

than that of the representation $F_i$, and
      of a mode of playback on the terminal of the representation $F_i$ or of the representation $F_j$ having a lower energy consumption, using said fundamental characteristics of the histograms of the values of brightness and/or of colors of the pixels corresponding to the multimedia segments.

According to a variant embodiment of the strategy for energy saving in the reception terminal, the method comprises for example the following steps:
  measuring the consumption of energy used by the terminal in the course of the playback of the representation $F_i$,
  comparing the reduction in consumption of decoding and display energy for the following segment with the need in terms of energy reduction or comparing the increase in consumption of decoding and display energy for the following segment with the increase in terms of energy supportable by the terminal,
  choosing the strategy for selecting the representation and for piloting the display making it possible to play back the multimedia content with optimal quality over the desired duration, between:
    selecting a lower quality but less consuming representation $F_j$, and/or increasing the saturation of the brightness in the playback of the representation,
    selecting a higher quality but more energy consuming representation $F_j$, and/or reducing the saturation of the brightness in the playback of the representation,
    retaining the same representation $F_i$ to be decoded and the same mode of playback of this representation.

According to one embodiment, use is made of the energy saving indicator $$PSRfromMax_i = 1 - \frac{E_i(t)}{E_{Max}(t)}$$

and/or the indicator $$PSRfromPrev_i = 1 - \frac{E_i(t)}{E_i(t-1)}$$

to control the choice of the representation $F_i$ to be downloaded and to anticipate the energy need.

The values of the ratios $$\frac{E_i(t)}{E_{Max}(t)} \text{ and } \frac{E_i(t)}{E_i(t-1)}$$

are, for example, calculated in real time and the manifest file and/or the data fields pointed at by the manifest file are updated accordingly.

The data processed by the method are video data. The multimedia data streams are, for example, coded as a single layer or as several interdependent layers.

The values of energies of the representations are based on an estimation of the decoding complexity of each of the representations and the method uses the fundamental characteristics of the histograms of the values of brightness and/or of color of the pixels of the images of the video segment, of the type based on population per class of values of brightness and/or of color, to estimate the consumption of the screen of the terminal for visual and sound playback of acceptable quality, whatever the back-lighting type in the case of LCD liquid-crystal technology or the lighting type integrated into each color pixel in the case of OLED (Organic Light-Emitting Diode) electroluminescent technology.

The invention also relates to a system for managing the choice of the multimedia representation or data stream originating from a service provider, during a download between a reception terminal and a server, as a function of the energy at the disposal of the terminal, characterized in that the service provider comprises a module suitable for executing the steps of the aforementioned method and notably for calculating at least one energy index corresponding to the ratio of the energy necessary to decode a representation $F_i$ with respect to the representation which generates the greatest energy consumption.

The system can comprise a module suitable for extracting the fundamental characteristics of the histograms of the values of brightness and/or of colors of the pixels corresponding to the multimedia segments the server storing the multimedia data, and the reception terminal comprising a module for calculating the energy consumed for the decoding and the playback of a stream $F_i$, a multimedia reader suitable for choosing the representation $F_i$ as a function of the measured energy value and of the energy saving constraints imposed on this reader, of the means of communication with the server.

The energy index calculation module is also suitable for determining a value $$\frac{E_i(t)}{E_i(t-1)}$$

corresponding to the energy at an instant t and to the energy at a previous instant (t−1) necessary for the playback of a given representation $F_i$.

According to a variant embodiment, the system comprises, stored on the server, a manifest file describing the nature and the storage address of the available representations, or else of the data fields pointed at by the manifest file comprising for N streams $F_i$ said energy index $$\frac{E_i(t)}{E_{Max}(t)}$$

and/or the index $$\frac{E_i(t)}{E_i(t-1)}.$$

The reception terminal is, for example, a mobile terminal comprising a screen and the representation is a video stream, the module of the service provider is suitable for estimating the decoding complexity of this video stream, and it comprises a module suitable for providing data making it possible to estimate the consumption of a screen of the user terminal for visual and sound playback of acceptable quality.

The system can comprise a module suitable for extracting the fundamental characteristics of the histograms of the values of brightness and/or of colors of the pixels of the video segment, a manifest file comprising for N streams $F_i$ said energy index $$\frac{E_i(t)}{E_{Max}(t)}$$

and said fundamental characteristics of the histograms H(component x) or a pointer to data fields comprising these metadata. H(component x) designates the histograms established on the basis of the components of brightness and of colors of the video images.

The invention also relates to a terminal for receiving at least one multimedia representation $F_i$ originating from a server, said terminal comprising at least one module for calculating the energy consumed for the decoding and the playback of said representation over one or more segments, said terminal being characterized in that it comprises a module suitable for defining the energy saving strategy offering optimal playback quality and for choosing in an automatic or manual manner a representation from among several of said representations, said representations being defined by an indicator of energy consumption of the representation of said stream with respect to the representation of said stream having the maximum consumption and/or of an indicator of the fundamental characteristics of the histograms of the values of brightness and/or of colors of the pixels of the video segment.

According to one embodiment, the automatic choice is performed by comparing a parameter representative of a duration of said stream with an item of data representative of the energy available on the terminal.

The terminal comprises, for example, a video data reader and a screen allowing the viewing of the video data.

BRIEF DESCRIPTION OF THE DRAWINGS

Other characteristics and advantages of the method and of the system according to the invention will be more apparent on reading the description which follows of an exemplary embodiment given by way of wholly nonlimiting illustration together with the figures which represent.

DETAILED DESCRIPTION

The description which follows is given by way of wholly nonlimiting illustration, to properly elucidate the method according to the invention, in the case of a video representation or stream that a user desires to download onto his terminal. The word terminal in the example given designates a mobile telephone, a tablet or any connected device making it possible to receive multimedia streams. It can be used, without departing from the scope of the invention, in the case of audio etc, multimedia data or streams. The term multimedia stream can designate varied programs, such as video games, films, music, which are distributed through communication networks. The fundamental characteristics of histograms make it possible to describe or characterize a histogram. This may involve the population accounted for in each class of values of the histogram or of the population accounted for above or below various thresholds of values.

The multimedia source content is split into several segments of a size which may be variable, which are thereafter coded (for example compressed) with various values of bitrate and/or resolution thus constituting the diverse representations available. These representations are stored on a server and accompanied by an index file that may be dynamic (manifest file) describing the nature and the storage address of the available representations. The term "representation" in the present description therefore designates a set of data coded with chosen compression parameters, or data streams. A representation is provided at a given instant for a duration that may be predefined by the application or undefined in the case of a live application.

Figure 1:
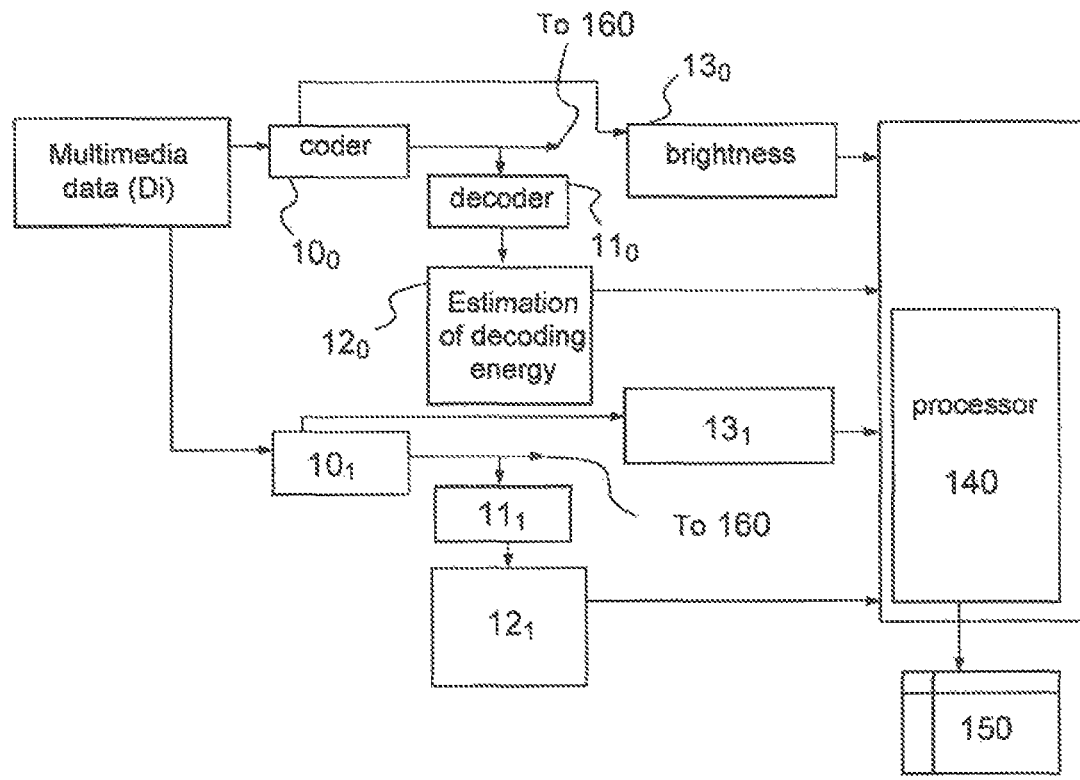
FIG. 1, the base modules of a service provider, which are used to calculate the energy index associated with a data stream on the coder side of the system, FIG. 2, the system of FIG. 1 associated with a module for shaping the data streams, FIG. 3, a complete system comprising the system on the coder side, a server and a mobile terminal, FIG. 4, a diagram of the exchanges between the parties of the system, FIG. 5, the base modules and the data flows, used in a client terminal for the selection and the management of the data streams, economical in terms of energy, FIG. 6, an exemplary stringing together of the steps in respect of an energy saving strategy in terms of decoding and display, FIG. 7, an exemplary translation of the decoding ratio Metadata in the benchmark of the client terminal of the current instant, and FIG. 8, an exemplary translation of the decoding ratio Metadata in the benchmark of the client terminal of the previous instant.

FIG. 1 represents an example of a service-provider architecture 20, in which the video data Di are transmitted to a first coder $10_0$ which will produce a compressed stream corresponding to a first video representation $F_1$, the stream is coded at a first bitrate value $Q_1$ and a resolution value $P_1$. This video representation $F_1$ is transmitted to a decoder $11_0$ and to a module $12_0$ which is suitable for calculating the decoding complexity of this video representation. The coder $10_0$ moreover provides histograms H(component x) of the values of brightness and of colors of the video images to a module $13_0$ adapted for extracting therefrom fundamental characteristics for visual and sound playback of acceptable quality, such as, for example, a list of pairs (level of saturation of the brightness of the pixels of the video stream, level of degradation introduced by this saturation). The modules for calculating decoding complexity and the module for calculating fundamental characteristics of the histograms are linked to a processor 140. The fundamental characteristics of the histograms of the values of brightness and/or of color of the pixels of the images of a video segment, of the type based on population per class of values of brightness and/or of color, make it possible to estimate the consumption of the screen of the terminal for visual and sound playback of quality acceptable by the to user, which is of back-lighting type in the case of LCD technology or of integrated lighting type.

During preparation of a representation, it is possible to generate segments of diverse bitrate/video resolution, but also, on one and the same bitrate/resolution pair, to generate segments giving rise to different consumptions of the reception terminal.

At a given instant t which is associated with a video representation $F_i$, the module $12_i$ estimates the decoding complexity $C_d(Fi)$ of the video representation $F_i$. This step is executed for the N coders $10_1, 10_2, \ldots 10_N$ of the system which generate N different representations, N bitrates $Q_N$, N resolutions $P_N$. Each coder $10_i$ is linked to a module $12_i$ to calculate the decoding complexity of a video representation. In the case of an application where the content is coded and transmitted in real time (case of a "Live" application), the decoding complexity at the instant t is that of the video segment commencing at the instant t. In the case of an application where the content is not coded and transmitted in real time (case of a video content on demand or VOD for example), the decoding complexity at the instant t can be the average complexity considered from the instant t up to the final instant of the video content.

The coder $10_0$ is also linked to a unique module $13_0$ adapted for calculating the fundamental characteristics of the pixels brightness histogram. The processor 140 thereafter determines the highest value $E_{max}$ of energy $E_i(t)$ from among the N values $E_i(t)$. The value of the energy $E_i(t)$ for a representation $F_i$ takes account of the decoding complexity of the representation, for example in terms of number of processing cycles. On the basis of these energy values, the processor 140 will determine at least one ratio value $$\frac{E_i(t)}{E_{Max}(t)}$$

for a given representation $F_i$ at a given instant:

$$\frac{consumption.of.energy.for.a.given.representation.Fi}{\substack{maximum.value.of.energy.\\ consumptions.for.the.N.representations}}$$

This ratio is calculated for each of the representations and reupdated regularly.

According to a complementary variant, the processor will also determine, for each of the N representations $F_i$, a second ratio $$\frac{E_i(t)}{E_i(t-1)}$$

by calculating the values Ei(t−1) and Ei(t) consumed to decode the segments for a representation at the instant t−1 and at the instant t. In the case of an application where the content is coded and transmitted in real time (case of a "Live" application), the decoding complexity at the instant t is that of the video segment commencing at the instant t. In the case of an application where the content is not coded and transmitted in real time (case of a VOD content for example), the decoding complexity at the instant t can be the average complexity from the instant t up to the final instant of the content whereas the decoding complexity at the instant t−1 can be the average complexity taken from the initial instant up to the instant t. If it is considered that (t−1) signifies the past and t the future, then in a VOD mode it may be considered that (t−1) refers to the average complexity of everything that has been played from the start and t everything that remains to be played.

These ratio values $$\frac{E_i(t)}{E_i(t-1)}$$

are for example stored in the manifest file or in data fields pointed at by the manifest file and associating with a representation $F_i$ an index $$\frac{E_i(t)}{E_i(t-1)}.$$

This second index used notably to monitor the evolution of a representation makes it possible to adapt more finely the display strategy for a representation, for example, the terminal will be able to choose a more complex representation, of better quality in terms of image playback, if its energy reserve so allows it, and tend to a quality optimum.

The processor 140 will thereafter define, for each of the N representations, an energy saving ratio PSR (Power Saving Ratio)

$$PSRfromMaxi = 1 - \frac{E_i(t)}{E_{Max}(t)}$$

and, in certain cases of applications, a second index or second energy saving ratio $$PSRfromPrev_i = 1 - \frac{E_i(t)}{E_i(t-1)}$$

representative of the evolution over time of the complexity of a representation, or of energy necessary for the decoding of a representation.

The system will therefore have at its disposal a file in which, for a given representation $F_i$ at an instant t, it associates at least one first index PSRfromMaxi representative of the energy or of the energy saving that may be achieved when one chooses to download one representation rather than another, and a second index $PSRfromPrev_i$ representative of the evolution of complexity and therefore of the energy necessary for the decoding of a representation.

The scale will be for example chosen as a function of the accuracy of control of the processors of the terminals.

These ratio values can be normalized on an arbitrary scale, for example a percentage scale on 8 or 16 bits.

$PSRfromMax_i$ systematically expressing a reduction can be expressed by a percentage on an unsigned integer of 7 or 8 bits.

$PSRfromPrev_i$ expressing a reduction or an increase, it is possible to express a percentage on an unsigned integer of 16 bits for ratios ranging from 1/100 to 100 in the following manner:

$$PSRfromPrevi = \text{Max}\left(\left(\text{floor}\left(\frac{Ei(t-1) - Ei(t)}{Ei(t-1)} * 100\right) + \text{offset}\right) \middle| 0\right)$$

with a 10 000 offset or shift, floor is known mathematical operator which returns the lower integer value, Max corresponds to the maximum. The offset can also be raised to $2^{15}$.

In this case, the client terminal will be able to subtract the offset from the value recovered on the server to obtain the percentage to be considered.

If the percentage is positive, this signifies that the ith representation $F_i(t)$ of the video segment in progress at the instant t is less complex than the ith representation of the segment at the previous instant t−1, $F_i(t-1)$, and the reduction in the complexity is given by its percentage. If the percentage is negative, this signifies that the ith representation of the video segment in progress at the instant t is more complex than the ith representation of the previous video segment and the increase in the complexity is given by the absolute percentage.

The value of the ratio PSRfromMaxi and the value PSRfromPrevi are included as metadata associated with a representation, for example, in a manifest file 150 or in data fields pointed at by the manifest file. The most energy-greedy stream is identified by a zero value of PSR. For each other representation $F_i$, a relative value of PSRfromMaxi is indicated. The relative values are for example expressed, either as a percentage %, or in discretized form on a graduated scale, for example by values +1, +2, etc. In the case of video data, the manifest file 150 comprises, for example, the indices $$\frac{E_i(t)}{E_{Max}(t)} \text{ and } \frac{E_i(t)}{E_i(t-1)}$$

for each of the N streams $F_i$, and the fundamental characteristics of the histograms H(component x) of the brightness values or a pointer to data fields containing these metadata.

The manifest file 150 or the data fields pointed at by the manifest file can be updated regularly, so as to keep the relative state of energy consumption of the representations up to date. As a function of the strategy of the terminals, this manifest file may be analyzed more or less regularly, as a function notably of the accuracy required by the application. For example, for an application demanding high reactivity, the method will look at the information of the manifest file for each segment that it downloads, whereas, for other types of application, the information will be provided only on the program as a whole. It is also possible to trigger a request every "n" segments.

Figure 2:
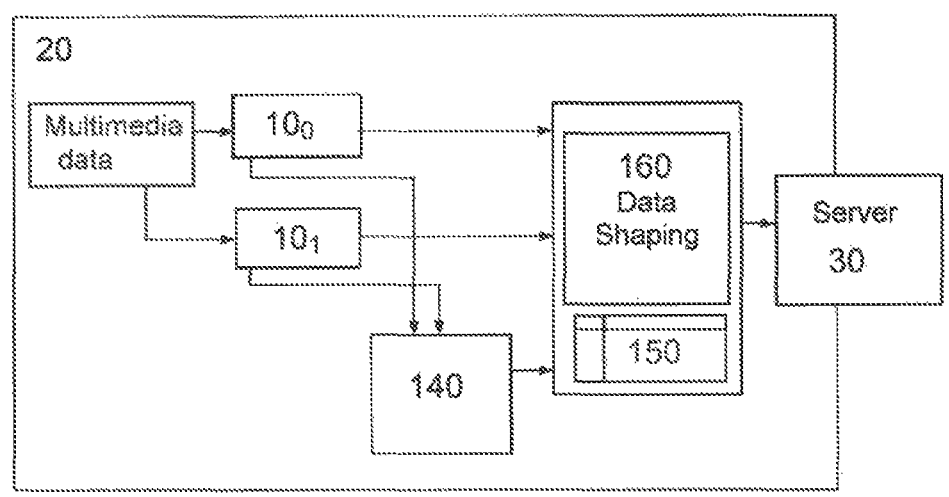

The streams or representations of the data arising from the coders $10_1, 10_2, \ldots 10_N$, are shaped and encapsulated, FIG. 2, by means of a suitable module 160, so that the representations are in a format accessible to the terminals. The shaped data as well as the manifest file 150 and the metadata fields are transmitted to the server 30 of a service provider 20. The server comprises several memories, one memory 301 making it possible to store the data streams. The manifest file 150 or the data fields pointed at by the manifest file comprise for each representation $F_i$ the value or the values of PSRfromMaxi and PSRfromPrevi stored on the server 30. The server also contains a manager making it possible to dynamically manage the requests of a user.

Figure 3:
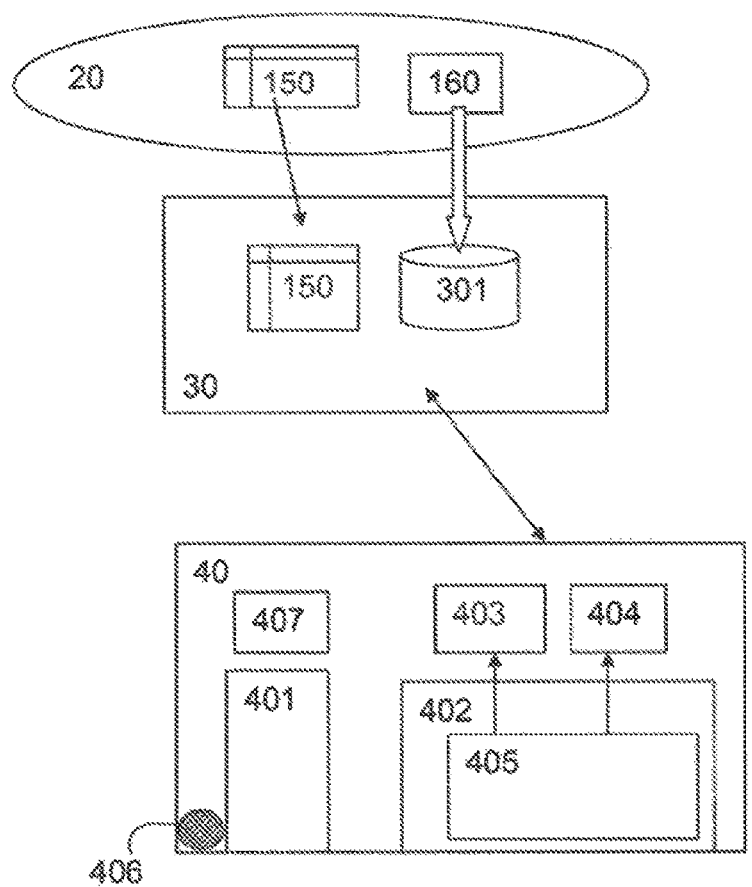
Figure 4:
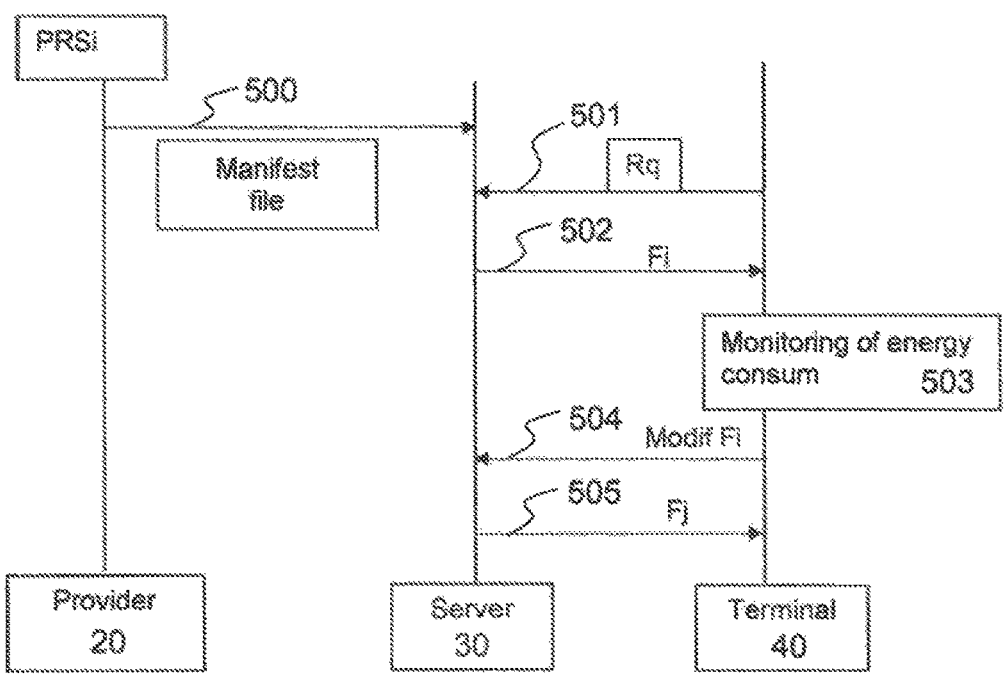

FIG. 3 and FIG. 4 illustrate an example of exchanges between a reception terminal 40, the server 30 and a service provider 10. The service provider transmits 500 a manifest file 150 to the server thus defining the set of available representations. The user or terminal comprises, for example, a power supply 401 (which may be a battery in the case of a mobile terminal), a processor 402 on which a multimedia reader 405 operates, suitable for executing the steps of the method according to the invention, a display screen 403, a module 404 for monitoring the energy consumption of the power supply, one or more loudspeakers 406, means of communication 407 with the server, these communication means being known to the person skilled in the art.

The reception terminal 40 transmits, 501, to the server 30, a request Rq to download a video representation $F_i$ containing a transmission that it desires to view, for example. The reader of the terminal will determine, as a function of the state of the network (available bandwidth determined on the basis of the capacity and of the loading of the network), the representation to be downloaded from among the N available representations described in the manifest file. It begins to download and play the representation $F_i$, 502, and at the same time it monitors, 503, the energy consumption of the battery 401 for the decoding and the playback of the representation $F_i$.

On the basis of the value of total duration of the multimedia content that the user desires to download (case of the Video on demand), of its energy consumption over time, visible for example by looking at the speed at which the battery of the mobile terminal discharges, of its energy consumption for the decoding and the playback of the last video segment or segments, of the evolution of decoding complexity of the current representation $F_i$ and of the possible energy saving for the playback of this representation, the reader of the terminal 40 will estimate whether it will have sufficient energy to download, decode and display the entire content. If it does, it will continue to download the representation $F_i$ or indeed allow itself to download a more complex but better quality representation. In the converse case, the processor or processors of the terminal will calculate by how much they must reduce their energy consumption, for example by x % with respect to the current representation. The processor or processors must then choose the best energy saving strategy to maintain optimal quality of playback between an energy saving on the screen or on the decoding. They will choose between retaining one and the same representation $F_i$ to be decoded and altering the playback of this representation or else selecting another representation $F_i$ 504, 505, if the energy reserve of the terminal is deemed insufficient to play back, over the desired duration, the multimedia content on the basis of the representation $F_i$, for example.

Figure 5:
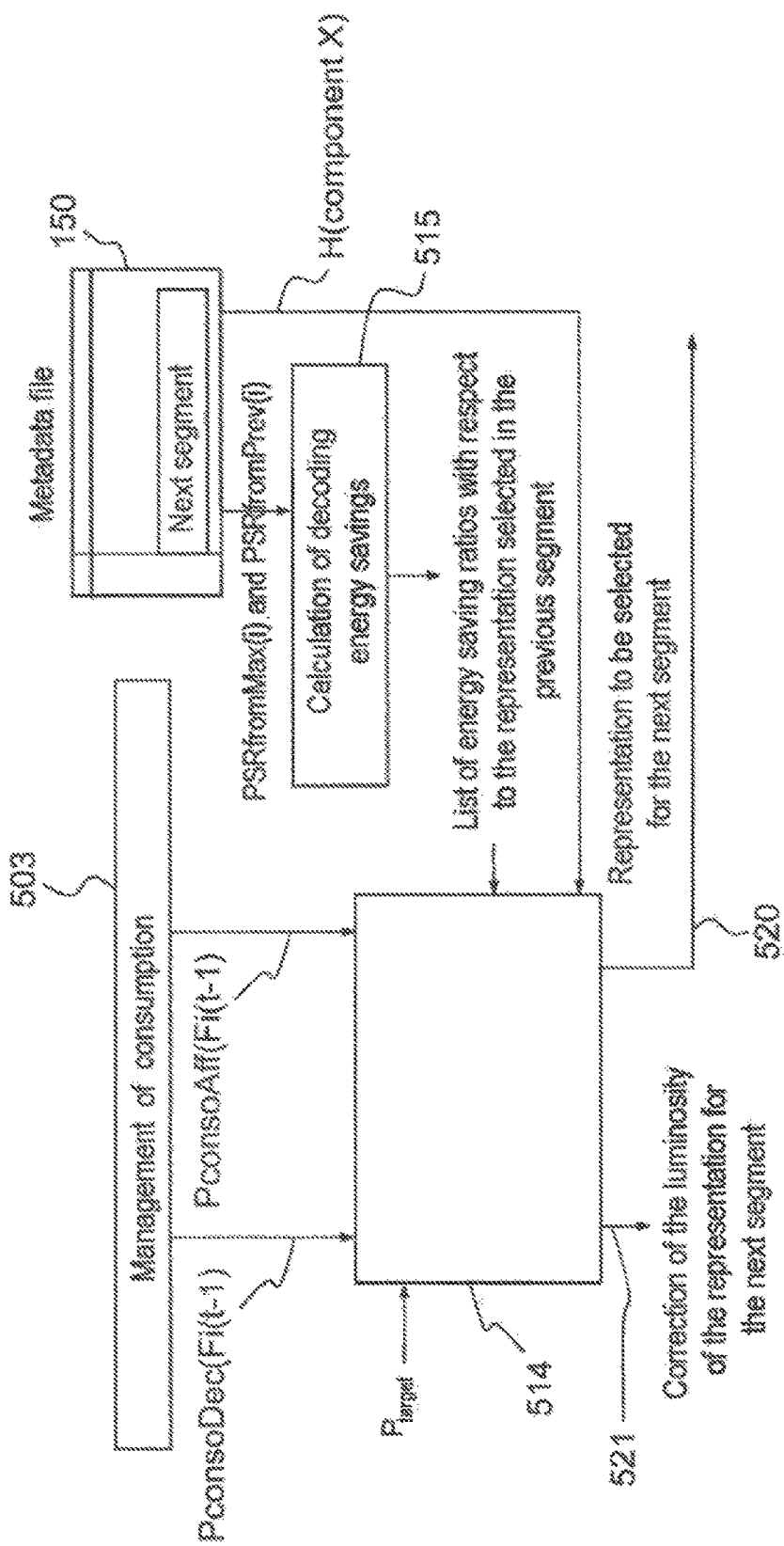

Accordingly, the following information is at the disposal of the processor(s):
- the average power or energy that the terminal can consume on the basis of the desired duration of use and the residual battery level ($P_{targetConsu}$ in FIG. 5),
- the power or the energy consumed by the decoding of the representation selected in the previous segment at the instant (t−1), $P_{decConsu}(Fi(t-1))$ provided by the module 503 for monitoring the consumption in FIG. 5,
- the power or the energy consumed by the visual and sound playback of the representation over the last segment or segments downloaded, $P_{dispConsu}(Fi(t-1))$ provided by the module 503 for monitoring the consumption,
- the data provided by the server:
  - data on the histograms of the brightness components and/or colors for each video segment, making it possible to optimize the consumption of the screen of the user terminal for visual and sound playback of given quality by effecting a drop in supply voltage of the light-emitting diodes or LEDs or the global brightness of the screen provided by the back-lighting system or organic light-emitting diodes or OLEDs and by compensating through an increase in brightness of the components of the pixels,
  - the energy saving indices based on the decoding complexity ratios for each video representation available for each segment PSRfromMax(i) and PSRfromPrev(i),
- the data specific to the terminal:
  - the charts (power consumed/supply voltage) of the screen,
  - the charts of the processor (power consumed/supply voltage, number of processing cycles per second/supply voltage) charged with the decoding.

It is possible to contemplate, for example, a strategy with two phases: seek by priority the screen side energy saving as long as it does not have any noticeable consequence on the quality of the playback of a representation, and then thereafter arbitrate between a higher screen side energy saving or the selection of a video representation which is less complex to decode by favoring the solution which maintains the best visual and sound playback.

This arbitration can be done in the manner described hereinafter. The energy saving indices PSRfromMax(i) based on the decoding complexity ratios for each representation i that were recovered from the server and expressed with respect to the most complex representation (0) can be expressed with respect to the current representation (the one that was used at the instant t−1) which will be referred to as RefRep.

Let $PSR\_fromRefRep_i$ be this index of energy saving with respect to the current representation:

PSR_fromRefRep(i)=1−((1−RSRfromMax(i))/(1−PSRfromMax$_{RefRep}$)).

If a percentage scale has been used, the calculation is then as follows:

$$PSRfromRefRep(i) = \left[1 - \left(\frac{100 - PSRfromMax(i)}{100 - PSRfromMax(RefRep)}\right)\right] \times 100$$

Figure 7:
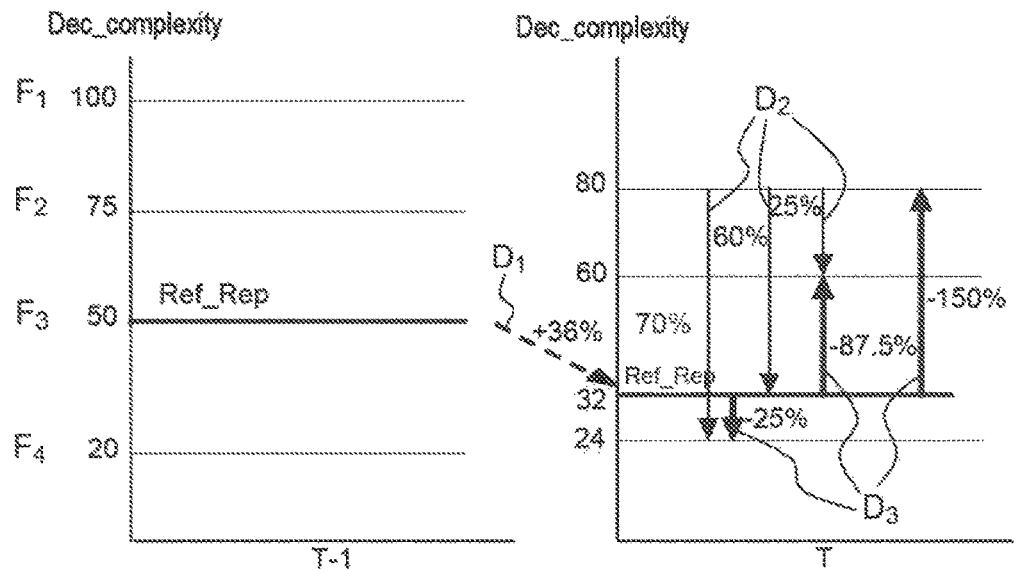

The values of PSR_fromRefRep(i) are illustrated by the arrows $D_3$ in FIG. 7. The energy saving index PSR_fromPrevRefRep based on the decoding complexity ratio for the next segment of the current representation with respect to the previous segment makes it possible to express the energy saving index of each representation with respect to the current representation of the previous segment:

PSR_fromPrevRefRep(i)=1−((1−PSRfromPrev$_{RefRep}$)×(1−PSRfromRefRep(i)))

If a percentage scale has been used, the calculation is then as follows:

$$PSR\_fromPrevRefRep(i) = \left[100 - \left(\frac{(100 - PSR\_fromPrev(RefRep)) * (100 - PSR\_fromRefRep(i))}{100}\right)\right]$$

Figure 8:
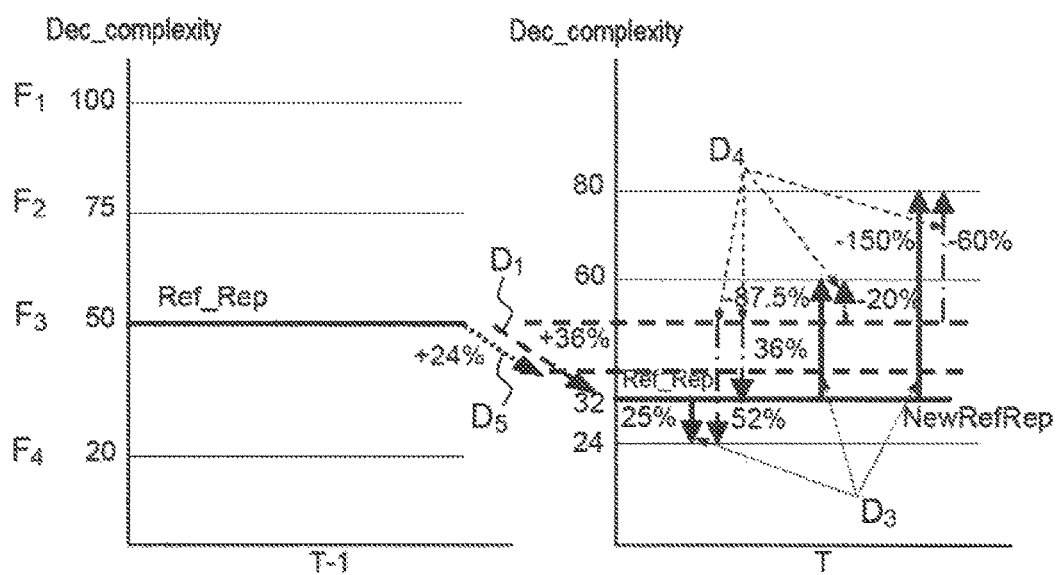

The values of PSR_fromPrevRefRep(i) are illustrated by the arrows $D_4$ in FIG. 8. These indices can then be translated into an energy saving ratio on the basis of the processor charts (number of processing cycles per second/supply voltage and power consumed/supply voltage).

The data on the values of the brightness components and/or colors for each video segment make it possible to measure the possible margin of maneuver on the side of the increase in brightness of the components of the pixels and of the associated drop in supply voltage of the LEDs or OLEDs for the terminal. This drop in supply voltage is translated into an energy saving by virtue of the chart (power consumed/supply voltage) of the screen.

The knowledge of the energy consumed by the decoding and by the visual playback of the representation which are selected over the last segment or segments downloaded and the knowledge of the possible energy saving ratios for the decoding of the various representations and for the playback make it possible to perform the following arbitration at the level of the module 514 (FIG. 5): the x % of energy saving desired is distributed between a y % of screen side energy saving and a z % of energy saving desired decoding side. It is then possible to select on the server the representation $F_j$, 505, 520, adapted on the basis of the precalculated energy saving ratios as well as the modification of the brightness values of the pixels of the representation and of the associated back-lighting 521 (FIG. 5.

Figure 6:
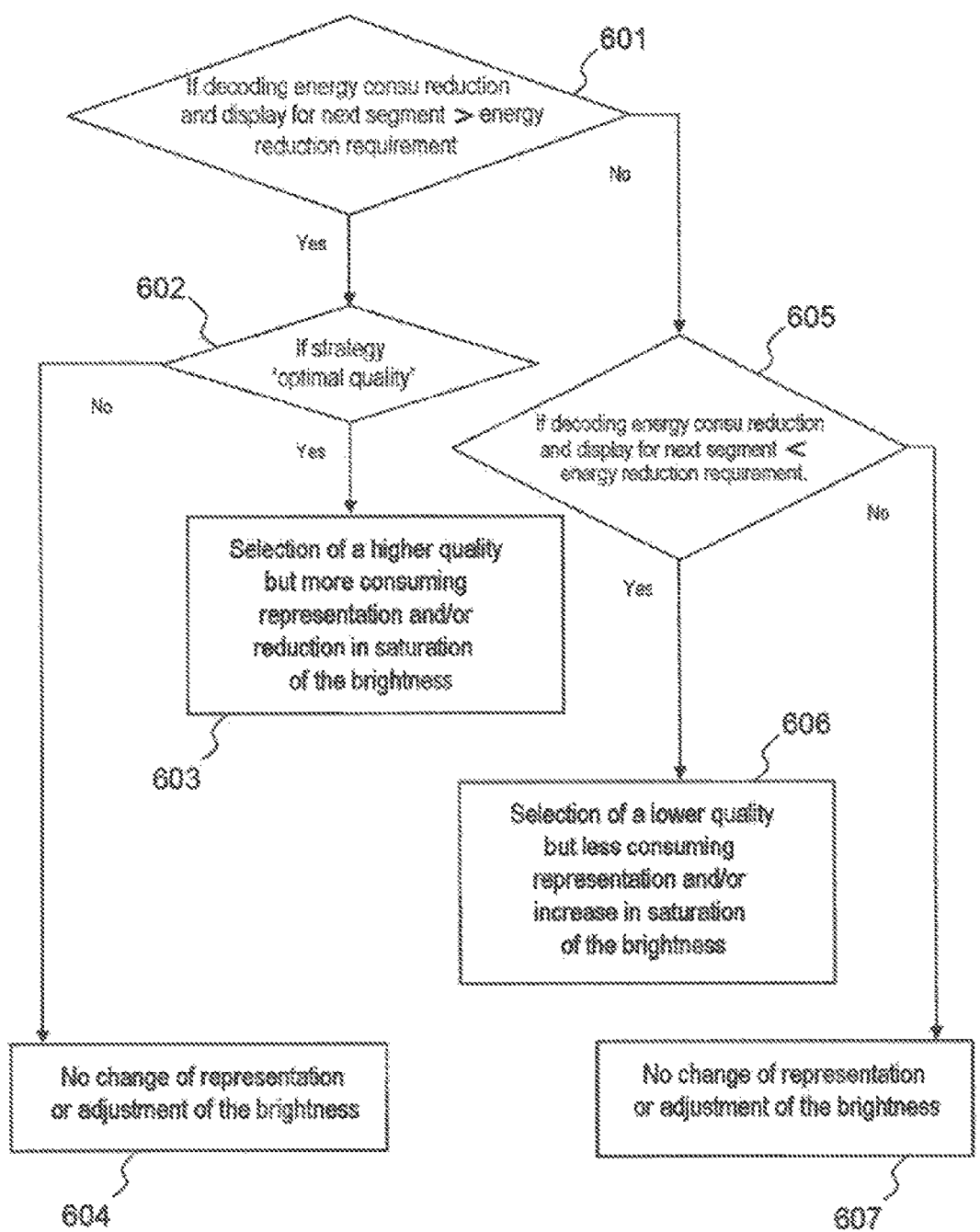

FIG. 6 illustrates another exemplary strategy for saving energy in terms of decoding and display, in which the terminal can seek an optimal representation quality and consume all of the available energy which is allocated to it over the fixed duration.

The terminal tests, 601, whether the reduction in consumption of decoding energy, represented by the arrow $D_1$ in FIG. 7 or 8, and of display energy for the following segment is greater than the need in terms of energy reduction, represented by the arrow $D_5$ in FIG. 8, or else whether the increase in consumption of decoding and display energy for the following segment is less than the increase in possible energy to attain the average consumption aimed at:

If so, then, 602, the method will test whether the terminal has an optimal representation quality strategy,
If so, then the user terminal can select, 603, a representation of higher quality but which consumes more energy and/or a reduction in saturation of the brightness,
In the converse case, 604, the terminal will not change representation and will not adjust the brightness;
If not, then, the method tests, 605, whether the reduction in consumption of decoding and display energy for the following segment is less than the need in terms of energy reduction or else whether the increase in consumption of decoding and display energy for the following segment is greater than the increase in possible energy to attain the average consumption aimed at,
if so, then the terminal will select a representation of lower quality but which consumes less and/or an increase in saturation of the brightness, 606,
if not, 607, then the terminal will not change representation and will not adjust the brightness.

FIG. 8 makes it possible to illustrate this strategy graphically: the terminal will select the representation whose upward or downward variation in decoding energy consumption with respect to the previous segment (represented by the arrow $D_4$) is the closest to the desired variation in energy consumption (represented by the arrow $D_1$). The arrow $D_2$ represents the variation in consumption with respect to the most energy-consuming representation.

For other cases of applications, for example, where the duration of the content is not a parameter known in advance, for example in the case of live applications, it may be contemplated that the mobile terminal is designed to display the possible duration of use if it continues to consume the chosen representation. Stream selection would then no longer be managed automatically, but the user, on the basis of this indicator of possible remaining duration, could intervene by means of a button or other means so as to be able to change stream and find a less energy-consuming stream.

The method steps explained above apply in respect of multimedia data streams which are coded as a single layer or as several interdependent layers, according to standards known to the person skilled in the art.

The method according to the invention exhibits notably the following advantages: the coder is capable of determining a value of energy saving ratio for each representation with respect to the maximum value of energy consumption thereby rendering the method independent of the technology of the coder used and of the type of terminal which will receive these streams. Moreover, by taking into account the evolution of the decoding complexity of a current segment with respect to the decoding complexity of the segment at a previous instant, it is possible to obtain the best strategy for decoding and display of a representation. The reception terminal is capable of adapting the representation to be used as a function of the remaining energy of its battery, or of the required playback quality, since it knows the desired duration of use or of providing the possible duration of use of the current representation. The energy index used to choose the data stream to be downloaded is independent of the processor of the user and of the coder used by the service provider.

The invention claimed is:

1. A method of adaptive broadcasting of multimedia or representation data streams $F_i$ originating from a service provider, during a download between a reception terminal and a server of the service provider, as a function of an energy criterion, comprising:

for the service provider:
determining, for N representations $F_i$, at least one first energy index by calculating, for each of the representations $F_i$ of a multimedia segment, a value of energy $E_i(t)$ consumed to decode the representation $F_i$ at the instant t, the maximum energy value $E_{Max}(t)$ associated with the most energy-consuming representation, and the values of the ratios corresponding $$\frac{E_i(t)}{E_{Max}(t)},$$

storing these values in a file associating with a representation $F_i$ at least one ratio $$\frac{E_i(t)}{E_{Max}(t)},$$

determining at least one second index corresponding to a value of ratio $$\frac{E_i(t)}{E_i(t-1)}$$

for a given representation $F_i$ at a given instant, and analyzing, using the at least one second index, an evolution of the representation $F_i$ provided by $$\frac{E_i(t)}{E_i(t-1)}$$

and to anticipate an energy saving need; and
for the reception terminal:
measuring the consumption of energy used by the terminal in the course of the playback of the representation $F_i$, and choosing another representation $F_j$ on the basis for the energy indices or altering the quality of playback of the representation if the energy reserve of the terminal is insufficient to play back to the content of the multimedia data stream over the desired duration on the basis of the representation $F_i$.

2. The method as claimed in claim 1, further comprising:
for the service provider:

storing fundamental characteristics of the histograms of the values of one or more of brightness and colors of the pixels corresponding to the multimedia segments in a manifest file describing the nature and the storage address of available representations or in data fields pointed at by the manifest file, and for the reception terminal:
implementing an energy saving strategy by optimizing a combination of (a) an automatic or manual choice of a representation $F_j$, having a lower energy consumption ratio $$\frac{E_j(t)}{E_{Max}(t)}$$

than that of the representation $F_i$, and (b) a mode of playback on the terminal of the representation $F_i$ or of the representation $F_j$ having a lower energy consumption, using said fundamental characteristics of the histograms of the values of one or more of brightness and colors of the pixels corresponding to the multimedia segments.

3. The method as claimed in claim 1, further comprising:
measuring the consumption of energy used by the terminal in the course of the playback of the representation $F_i$;
comparing the reduction in consumption of decoding and display energy for the following segment with the need in terms of energy reduction or comparing the increase in consumption of decoding and display energy for the following segment with the increase in terms of energy supportable by the terminal; and
choosing a strategy for selecting the representation and for piloting the display to play back the multimedia content with optimal quality over the desired duration, between:
one or more of selecting a lower quality but less energy consuming representation $F_j$ and increasing the saturation of the brightness in the playback of the representation,
one or more of selecting a higher quality but more energy consuming representation $F_j$ and reducing the saturation of the brightness in the playback of the representation, and
retaining the same representation $F_i$ to be decoded and the same mode of playback of this representation.

4. The method as claimed in claim 1, wherein the multimedia data streams are coded as a single layer or as several interdependent layers.

5. The method as claimed in claim 1, wherein:
the values $$\frac{E_i(t)}{E_{Max}(t)} \text{ and } \frac{E_i(t)}{E_i(t-1)}$$

are stored in a manifest file describing the nature and the storage address of the available representation or in data fields pointed at by the manifest file associating with a representation $F_i$ a first index $$\frac{E_i(t)}{E_{Max}(t)}$$

end a second index $$\frac{E_i(t)}{E_i(t-1)},$$

and
the fundamental characteristics of the histograms of the values of one or more of brightness and colors of the pixels corresponding to the multimedia segments are stored in the manifest file or in data fields pointed at by the manifest file.

6. The method as claimed in claim 1, where use is made of one or more of the energy saving indicator $$PSRfromMaxi = 1 - \frac{E_i(t)}{E_{Max}(t)},$$

and the indicator $$PSRfromPrev_i = 1 - \frac{E_i(t)}{E_i(t-1)}$$

to control the choice of the representation $F_1$, to be downloaded and to anticipate the energy need.

7. The method as claimed in claim 1, wherein the values of the ratios $$\frac{E_i(t)}{E_{Max}(t)} \text{ and } \frac{E_i(t)}{E_i(t-1)}$$

are calculated in real time and one or more of the manifest file and the data fields pointed at by the manifest file updated accordingly.

8. The method as claimed in claim 1, wherein the data are video data, and wherein the values of energies of the representations are based on an estimation of the decoding complexity of each of the representation and in that use is made of fundamental characteristics of the histograms of the values of one or more of brightness and color of the pixels of the images of the video segment, of the type based on population per class of values of one or more brightness and color to estimate the consumption of the screen of the terminal for visual and sound playback of acceptable quality whatever the conditions of use.

9. A system for managing the choice of the multimedia representation or data stream originating from a service provider, during a download between a reception terminal and a server, as a function of the energy at the disposal of the terminal, comprising:
at the server of the service provider:
one or more first processors; and
one or more first non-transitory computer-readable storage mediums storing a first set of one or more sequences of instructions, which when executed by the one or more first processors, cause the one or more first processors to:
determine, for N representations $F_i$, at least one first energy index by calculating, for each of the representations $F_i$ of a multimedia segment, a value of energy $E_i(t)$ consumed to decode the representation $F_i$ at the instant t, the maximum energy value $E_{Max}(t)$ associated with the most energy-consuming representation, and the values of the ratios corresponding $$\frac{E_i(t)}{E_{Max}(t)},$$

storing these values in a file associating with a representation $F_i$, at least one ratio $$\frac{E_i(t)}{E_{Max}(t)},$$

determine at least one second index corresponding to a value of ratio $$\frac{E_i(t)}{E_i(t-1)}$$

for a given representation $F_i$ at a given instant, and analyze, using the at least one second index, an evolution of the representation $F_i$ provided by $$\frac{E_i(t)}{E_i(t-1)}$$

and to anticipate an energy saving need; and at the reception terminal:
one or more second processors; and
one or more second non-transitory computer-readable storage mediums storing a second set of one or more sequences of instructions, which when executed by the one or more second processors, cause the one or more second processors to:
measure the consumption of energy used by the terminal in the course of the playback of the representation $F_i$ and choosing another representation $F_i$ on the basis for the energy indices or altering the quality of playback of the representation if the energy reserve of the terminal is insufficient to play back to the content of the multimedia data stream over the desired duration on the basis of the representation $F_i$, and
wherein the service provider comprises a calculation software module, executing on said one or more first processors, that cause said one or more first processors to calculate at least one energy index corresponding to the ratio of the energy necessary to decode a representation $F_i$ with respect to the representation which generates the greatest energy consumption.

10. The system as claimed in claim 9, further comprising:
an extraction software module, executing on said one or more first processors, to cause said one or more first processors to extract the fundamental characteristics of the values of one or more of brightness and colors of the pixels corresponding to the multimedia segments, wherein said server stores the multimedia data, and wherein the reception terminal further comprises (a) a calculation software module, executing on said one or more second processors, to cause the one or more second processors to calculate the energy consumed for the decoding and the playback of a stream $F_i$, (b) a multimedia reader to cause said one or more second processors to choose the representation $F_i$ as a function of the measured energy value and of the energy saving constraints imposed on this reader, and (c) a communication software module, executing on said one or more second processors, to cause said one or more second processors to exchange communications with the server.

11. The system as claimed in claim 9, wherein the calculation software module determines a value $$\frac{E_i(t)}{E_i(t-1)}$$

corresponding to the energy at an instant t and to the energy at a previous instant (t−1) necessary for the playback of a given representation $F_i$.

12. The system as claimed in claim 9, further comprising:
a manifest file, stored on the server, which describes the nature and the storage address of the available representation or of the data fields pointed at by the manifest file comprising for N streams $F_i$ one or more of said energy index $$\frac{E_i(t)}{E_{Max}(t)}$$

and the index $$\frac{E_i(t)}{E_i(t-1)}.$$

13. The system as claimed in claim 9, wherein the reception terminal is a mobile terminal comprising a screen and the representation is a video stream, wherein the calculation software module of the service provider estimates the decoding complexity of this video stream, and wherein the system further comprises:
an estimation software module, executing on said one or more first processors, to cause said one or more first processors to provide data to estimate the consumption of a screen of the user terminal for visual and sound playback of acceptable quality.

14. The system as claimed in claim 13, further comprising:
an extraction software module, executing on said one or more first processors, to cause said one or more first processors to extract the fundamental characteristics of the histograms of the values of one or more of brightness and colors of the pixels of the video segment, a manifest file comprising for N streams Fi said energy index $$\frac{E_i(t)}{E_{Max}(t)}$$

and said fundamental characteristics of the histograms H(component x) or a pointer to data fields comprising these metadata.

15. A terminal for receiving at least one multimedia representation Fi originating from a server, said terminal comprising at least one calculation software module, executing on at least one of the one or more processors, that calculates the energy consumed for the decoding and the playback of said representation Fi over one or more segments, said terminal comprising a strategy defining software module, executing on at least one of the one or more processors, that defines an energy saving strategy offering an optimal playback quality and chooses in an automatic or manual manner a representation from among several of said representations, said representations being defined by at least one indicator of energy consumption of the representation of said stream with respect to the representation of said stream having one or more of the maximum consumption, and an indicator of the evolution of the representation, and an indicator of the fundamental characteristics of the histograms of the values of one or more of brightness and colors of the pixels of the video segment, wherein said terminal determines at least one index corresponding to a value of ratio $$\frac{E_i(t)}{E_i(t-1)}$$

for a given representation $F_i$ at a given instant, and analyzes, using the at least one index, an evolution of the representation $F_i$ provided by $$\frac{E_i(t)}{E_i(t-1)}$$

and to anticipate an energy saving need.

16. The terminal for receiving a multimedia stream as claimed in claim 15, wherein the automatic choice is performed by comparing a parameter representative of a duration of said stream with an item of data representative of the energy available on the terminal.

17. The reception terminal as claimed in claim 16, further comprising one or more of a screen and a video data reader.

18. The method as claimed in claim 2, further comprising:
   measuring the consumption of energy used by the terminal in the course of the playback of the representation $F_i$;
   comparing the reduction in consumption of decoding and display energy for the following segment with the need in terms of energy reduction or comparing the increase in consumption of decoding and display energy for the following segment with the increase in terms of energy supportable by the terminal; and
   choosing the strategy for selecting the representation and for piloting the display to play back the multimedia content with optimal quality over the desired duration, between:
      (a) one or more of selecting a lower quality but less consuming representation $F_j$ and increasing the saturation of the brightness in the playback of the representation,
      (b) one or more of selecting a higher quality but more energy consuming representation $F_j$, and reducing the saturation of the brightness in the playback of the representation, and
      (c) retaining the same representation $F_i$ to be decoded and the same mode of playback of this representation.

19. A terminal receiver using a download of adaptive streaming multimedia data or representation $F_i$ from a services supplier, comprising:
   one or more processors; and
   one or more non-transitory computer-readable storage mediums storing one or more sequences of instructions, which when executed by the one or more processors, cause the one or more processors to:
      determine the availability of energy index and fundamental characteristics of the luminosity corresponding to the multimedia segments in a manifest file describing the nature and the storage address of the available representations or in fields of data pointed by the manifest file,
      determine at least one second index corresponding to a value of ratio $$\frac{E_i(t)}{E_i(t-1)}$$

for a given representation $F_i$ at a given instant, and analyze, using the at least one second index, an evolution of the representation $F_i$ provided by $$\frac{E_i(t)}{E_i(t-1)}$$

and to anticipate an energy saving need,
      download these energy indexes and fundamental characteristics of one or more of the luminosity and color values of the pixels; and
      implement an energy saving strategy by optimizing a combination of:
      (a) an automatic or manual choice of a representation $F_j$, having a lower energy consumption ratio $$\frac{E_j(t)}{E_{Max}(t)}$$

than that of the representation $F_i$, and
      b) a mode of playback on the terminal of the representation $F_1$ or of the representation $F_j$ having a lower energy consumption, using said fundamental characteristics of the histograms of the values of one or more of brightness and colors of the pixels corresponding to the multimedia segments.

20. A terminal receiver using a download of adaptive streaming multimedia data or representation $F_i$ from a services supplier, comprising:
   one or more processors; and
   one or more non-transitory computer-readable storage mediums storing one or more sequences of instructions, which when executed by said one or more processors, cause the one or more processors to:
      determine the availability of energy index and color values of the pixels corresponding to the multimedia segments in a manifest file describing the nature and the storage address of the available representations or in fields of data pointed by the manifest file;

determine at least one second index corresponding to a value of ratio $$\frac{E_i(t)}{E_i(t-1)}$$

for a given representation $F_i$ at a given instant;

analyze, using the at least one second index, an evolution of the representation $F_i$ provided by $$\frac{E_i(t)}{E_i(t-1)}$$

and to anticipate an energy saving need;

download these energy indexes and fundamental characteristics of one or more of the luminosity and color values of the pixels; and implement an energy saving strategy by optimizing a combination of:

(a) an automatic or manual choice of a representation $F_j$, having a lower energy consumption ratio $$\frac{E_j(t)}{E_{Max}(t)}$$

than that of the representation $F_i$, and (b) a mode of playback on the terminal of the representation $F_i$ or of the representation $F_j$ having a lower energy consumption, using said fundamental characteristics of colors of the pixels corresponding to the multimedia segments.

21. The terminal receiver as claimed in claim 19, wherein execution of the one or more sequences of instructions further cause the one or more processors to:

measure the consumption of energy used by the terminal in the course of the playback of the representation $F_i$, compare the reduction in consumption of decoding and display energy for the following segment with the need in terms of energy reduction or comparing the increase in consumption of decoding and display energy for the following segment with the increase in terms of energy supportable by the terminal, choose the strategy for selecting the representation and for piloting the display to play back the multimedia content with optimal quality over the desired duration, between:

(a) one or more of selecting a lower quality but less consuming representation $F_j$, and increasing the saturation of the brightness in the playback of the representation, and (b) one or more of selecting a higher quality but more energy consuming representation $F_j$, and reducing the saturation of the brightness in the playback of the representation, and retain the same representation $F_i$ to be decoded and the same mode of playback of this representation.

* * * * *